(12) United States Patent  
Hughes, Jr.

(10) Patent No.: US 12,539,546 B2
(45) Date of Patent: Feb. 3, 2026

(54) TUBE NOTCHING APPARATUS WITH ADJUSTABLE POSITIONING FEATURES

(71) Applicant: Robert Kyle Hughes, Jr., Johnson City, TN (US)

(72) Inventor: Robert Kyle Hughes, Jr., Johnson City, TN (US)

(*) Notice: Subject to any disclaimer, the term of this patent is extended or adjusted under 35 U.S.C. 154(b) by 473 days.

(21) Appl. No.: 17/950,401

(22) Filed: Sep. 22, 2022

(65) Prior Publication Data

US 2023/0088748 A1    Mar. 23, 2023

Related U.S. Application Data

(60) Provisional application No. 63/247,061, filed on Sep. 22, 2021.

(51) Int. Cl.
*B23B 47/28*    (2006.01)
*B23B 41/00*    (2006.01)

(52) U.S. Cl.
CPC .......... *B23B 47/281* (2013.01); *B23B 41/003* (2013.01); *B23B 2215/72* (2013.01); *B23B 2247/10* (2013.01); *B23B 2270/08* (2013.01)

(58) Field of Classification Search
CPC ..... B23B 41/12; B23B 41/003; B23B 47/281; B23B 2215/72; B23B 2247/10; B23B 2260/088; B23B 2270/08
See application file for complete search history.

(56) References Cited

U.S. PATENT DOCUMENTS

| 5,118,228 | A | 6/1992 | Story |
| 7,607,870 | B2 | 10/2009 | Hughes, Jr. |
| 8,152,419 | B1* | 4/2012 | Snyder ................ B23B 47/281 408/110 |
| 10,780,486 | B1* | 9/2020 | Wong .................... B21D 28/24 |
| 2012/0243954 | A1* | 9/2012 | Rusch ..................... B25B 5/147 408/103 |
| 2022/0088688 | A1* | 3/2022 | Gambino ............... B23D 45/12 |

FOREIGN PATENT DOCUMENTS

DE    1026151 B    *    3/1958

OTHER PUBLICATIONS

English translation of DE 1026151 (Year: 1958).*

* cited by examiner

*Primary Examiner* — Alan Snyder
(74) *Attorney, Agent, or Firm* — Blanchard Horton PLLC (57) ABSTRACT

A rotary tube notching apparatus is provided that is capable of operable attachment to a powered rotational drive device. The apparatus comprises a tube support assembly defining an aperture for receiving a tube and having a clamp for securing the tube against movement in relation to the aperture. A shaft assembly is provided for receiving a cutting tool, and a carriage assembly is rotatably mounted to the shaft assembly. The carriage assembly has at least one fastener for securing the shaft assembly in relation to the aperture. The shaft assembly is selectively repositionable in relation to the aperture in an offset dimension defined by linear displacement from a central axis of the aperture, in a yaw dimension defined by a plane extending along a central axis of the aperture, and in a roll dimension defined by a cross-sectional circumference of a tube received within the aperture.

2 Claims, 8 Drawing Sheets

TUBE NOTCHING APPARATUS WITH ADJUSTABLE POSITIONING FEATURES

CROSS-REFERENCE TO RELATED APPLICATIONS

This application claims the benefit of U.S. Provisional Application No. 63/247,061, filed Sep. 22, 2021, which is incorporated in its entirety herein by reference.

STATEMENT REGARDING FEDERALLY SPONSORED RESEARCH OR DEVELOPMENT

Not Applicable.

FIELD OF INVENTION

The present general inventive concept pertains to tube notchers, and more particularly to a tube notching apparatus having adjustable positioning features capable of performing cuts in both round and non-round tubing.

BACKGROUND

In order to manufacture products comprised of tubular metal, such as automotive exhaust systems, roll-cages and numerous other framed support structures, it is necessary to join sections of hollow metal tubing, typically by means of welding, brazing and/or soldering. In order to accomplish proper interconnection of such tubing members for permanent union it is first necessary to "notch" one of the tubes so that it matingly conforms to the exterior surface of the tube to which it is to be connected. Several methods have been employed to achieve the desired fit of such abutting tubular surfaces, including the use of hand-held coping tools, punch and die combinations, and band saws. The present general inventive concept relates to yet another species of notching apparatus, namely, a rotary cutting tool or "hole saw".

A variety of rotary cutting devices have been designed to produce precisely contoured ends of tubing for connection with the periphery of another tubing member. Some such devices are handheld while others are surface mounted. Of this latter type, some are designed to maintain the cutting tool in vertical orientation above the work piece, such as by mounting the device in a drill press or in a vice and attaching a hand drill. The orientation of the work piece relative to the cutting tool is then manipulated to achieve the proper angle of penetration. A first problem with this arrangement is that there is often insufficient room to properly position elongate tube members since movement is impeded by either the floor (when adjusting the tube about a vertical plane) or by surrounding walls or other table mounted equipment (when adjusting the tube about a horizontal plane). A second problem frequently encountered is that the weight of the hand drill causes the cutting member to descend too rapidly into the work piece, which can result in binding and/or damage to the work piece.

In order to obviate the shortcomings and limitations of the above-described prior art surface-mounted tube notching devices, it has been found useful to achieve the desired angles of penetration by retaining the work piece in a fixed and preferably horizontal position while adjusting the orientation of the cutting tool relative thereto, rather than vice versa. One such device is described in U.S. Pat. No. 5,118, 228, issued to Story (hereinafter "Story"). Story teaches that a length of steel tubing may be confined within a pipe support unit using clamping means and an articulated cutter head unit may then be aligned to intersect the midpoint of the steel tubing at a desired angle. A key feature of the Story device is that the work piece remains stationary and secure while the cutter head is disposed at a selected angular orientation relative to the work piece. A hand drill is then attached to the shaft of the cutter head to impart rotary motion.

Another prior art device is described in U.S. Pat. No. 7,607,870, issued to Hughes (hereinafter "Hughes"). Hughes teaches that a length of steel tubing may be confined within a tube support assembly having a height adjustable carriage assembly pivotally mounted thereto. The carriage assembly of Hughes is configured to hold a rotary cutting tool and may be adjusted along multiple degrees of freedom in order to accommodate notching of the confined tube along paths offset from the longitudinal axis of the workpiece, along paths extending at both acute and obtuse angles to the longitudinal axis of the workpiece, or along a bent section of tubing.

One shortcoming of both the Story device and the Hughes device is that neither device is designed for, nor particularly suited to create, notches in tubing having a non-round cross-section, such as for example in square or rectangular tubing, at any of a variety of angles about the circumference of the tubing. The tube support assembly of the Hughes device includes a tube-receiving channel having a generally right-angle shape. Thus, the Hughes device is at least somewhat capable of receiving a square or rectangular tubing within the tube support assembly. However, in the Hughes device, secure support of a square or rectangular shaped tubing is limited to the cross-sectionally-circumferential orientation of the workpiece that is defined by the right-angle shaped channel of the tube support assembly. Thus, while the Hughes device may allow for notches to be created in a non-round tube along a very limited number of angles about the cross-sectional circumference of the tube, the device of Hughes is not suited to create notches in a non-round tube along all, or even many, angles about the cross-sectional circumference of the tube.

In view of the shortcomings and limitations of the prior art, there has existed a longstanding need for a rotary tube notching apparatus designed to securely hold both round and non-round tubing and having means for adjusting the orientation of the tubing in relation to the cutting mechanism about the circumference of the cross-section of the tubing, such that it may create straight, angled, and offset notches in the tubing about a variety of orientations. The subject apparatus fulfils these objectives and others as set forth in greater detail herein.

BRIEF SUMMARY OF THE INVENTION

According to various example embodiments of the present general inventive concept, a rotary tube notching apparatus is provided that is capable of operable attachment to a powered rotational drive device. Various example embodiments of the present general inventive concept may include a tube support assembly defining an aperture for receiving a tube and a clamp for securing the tube against movement in relation to the aperture. Various example embodiments of the present general inventive concept may also include a shaft assembly for receiving a cutting tool, and a carriage assembly may be rotatably mounted to the shaft assembly. The carriage assembly may have at least one fastener for securing the shaft assembly in relation to the aperture. The shaft assembly may be selectively repositionable in relation to the aperture in an offset dimension, defined by linear displacement from a central axis of the aperture, in a yaw dimension, defined by a plane extending along a central axis of the aperture, and in a roll dimension, defined by a cross-sectional circumference of a tube received within the aperture.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a tube notching apparatus capable of operable attachment to a powered rotational drive device, the apparatus comprising a tube support assembly defining an aperture for receiving a tube and having a clamp for securing the tube against movement in relation to the aperture, a shaft assembly for receiving a cutting tool, and a carriage assembly rotatably mounted to the shaft assembly and having at least one fastener for securing the shaft assembly in relation to the aperture, wherein the shaft assembly is selectively repositionable in relation to the aperture in an offset dimension defined by linear displacement from a central axis of the aperture, in a yaw dimension defined by a plane extending along a central axis of the aperture, and in a roll dimension defined by a cross-sectional circumference of a tube received within the aperture.

Various additional aspects and advantages of the present general inventive concept may be achieved wherein the tube support assembly further comprises a first frame member defining the aperture. Various additional aspects and advantages of the present general inventive concept may be achieved wherein the carriage assembly is slidably mounted to the first frame member. Various additional aspects and advantages of the present general inventive concept may be achieved wherein the first frame member defines a plurality of channels extending parallel to one another along a plane perpendicular to an axial dimension of the aperture, and wherein the carriage assembly is slidably and removably mountable along each of the channels. Various additional aspects and advantages of the present general inventive concept may be achieved wherein the carriage assembly defines a mounting surface extending along a plane parallel to the axial dimension of the aperture. Various additional aspects and advantages of the present general inventive concept may be achieved wherein the carriage assembly further comprises a pivot member pivotally secured along the mounting surface for rotation along the plane parallel to the axial dimension of the aperture. Various additional aspects and advantages of the present general inventive concept may be achieved wherein the carriage assembly further comprises a bearing block mounted along the mounting surface, the bearing block defining a cylindrical bearing for receiving the shaft assembly. Various additional aspects and advantages of the present general inventive concept may be achieved wherein the bearing block is removably mountable at one of a plurality of positions along the pivot member.

Various additional aspects and advantages of the present general inventive concept may be achieved wherein the aperture defines at least a portion of a first rectangular shape for orienting a tube in a first orientation about an axial dimension of the aperture. Various additional aspects and advantages of the present general inventive concept may be achieved wherein the aperture defines at least a portion of a second rectangular shape for orienting the tube in a second orientation about the axial dimension of the aperture. Various additional aspects and advantages of the present general inventive concept may be achieved wherein the first frame member comprises a support structure and a plate defining the aperture, the plate being rotatable in relation to the support structure along a plane perpendicular to the axial dimension of the aperture. Various additional aspects and advantages of the present general inventive concept may be achieved wherein the plate defines a plurality of indicia around at least a portion of a circumference of the aperture. Various additional aspects and advantages of the present general inventive concept may be achieved wherein the support structure defines at least one reference mark configured to cooperate with the indicia to denote at least one of a plurality of orientations of a tube received by the aperture about the axial dimension of the aperture.

Various additional aspects and advantages of the present general inventive concept may be achieved wherein the tube support assembly further comprises a tube retention device configured to secure a portion of a tube within the aperture. Various additional aspects and advantages of the present general inventive concept may be achieved wherein the tube retention device comprises a clamp head mounted for linear translation toward and away from the aperture. Various additional aspects and advantages of the present general inventive concept may be achieved wherein the tube retention device further comprises a rod secured to the clamp head and mounted for movement along a central axis of the rod in relation to the first frame member. Various additional aspects and advantages of the present general inventive concept may be achieved wherein the tube retention device further comprises a carriage defining an internally threaded through hole, and in which the rod defines external threads sized and shaped to threadably mate with and engage the through hole, whereby rotation of the rod about the central axis of the rod results in translation of the rod and clamp head toward and away from the aperture. Various additional aspects and advantages of the present general inventive concept may be achieved wherein the carriage is removably mountable to the first frame member at a plurality of locations about the aperture. Various additional aspects and advantages of the present general inventive concept may be achieved wherein the tube support assembly further comprises a second frame member and wherein the first and second frame member cooperate to define the aperture, the carriage being removably mountable between the first and second frame members at a plurality of locations about the aperture. Various additional aspects and advantages of the present general inventive concept may be achieved wherein the clamp head defines at least a portion of a rectangular shape for orienting a tube in a first orientation about an axial dimension of the aperture.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a tube notching apparatus is provided that includes a plurality of adjustable positioning features. In various example embodiments, the tube notching apparatus 10 includes generally a surface mountable tube support assembly 12 configured to receive and support a tubular workpiece, a carriage assembly 14 adjustably mounted in relation to the tube support assembly 12, and a shaft assembly 16 rotatably mounted to the carriage assembly 14. The shaft assembly 16 is capable of operable attachment to a powered rotational drive device, such as a drill, and is configured to allow linear translation of a rotatable cutting tool coupled to the rotational drive device toward and away from a workpiece received and supported by the support assembly 12. Thus, the rotatable cutting tool may be used to cut a "notch" in the workpiece. According to several embodiments constructed in accordance with various features of the present general inventive concept, the carriage assembly 14 and/or support assembly 12 may include a plurality of adjustable positioning features that may allow for the adjustable positioning of the linear path of the rotatable cutting tool in relation to the workpiece in directions corresponding to a linear "offset" in relation to a longitudinal central axis of the workpiece, an angular "pitch" in relation to the longitudinal central axis of the workpiece, and an angular "roll" along a cross-sectional circumference of the workpiece. According to several further embodiments constructed in accordance with various features of the present general inventive concept, the support assembly 12 may include one or more support features for grasping and supporting a non-round tubular workpiece against rolling in relation to the support assembly 12, such that the non-round tubular workpiece may be maintained in relation to the angular "roll" position of the shaft assembly 16.

Figure 1:
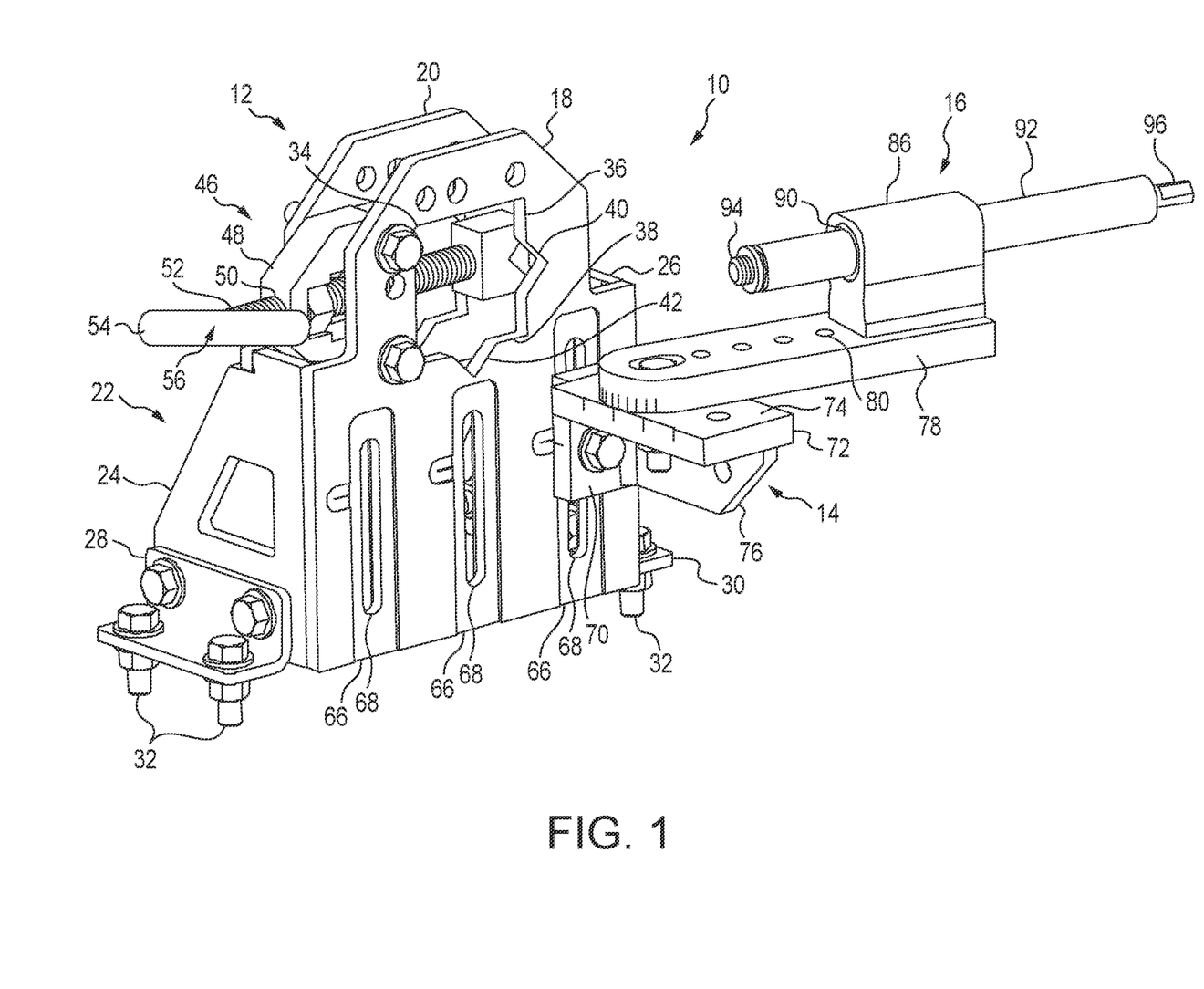
FIG. 1 illustrates a perspective view of a tube notching apparatus with adjustable positioning features according to an example embodiment of the present general inventive concept.
Figure 2:
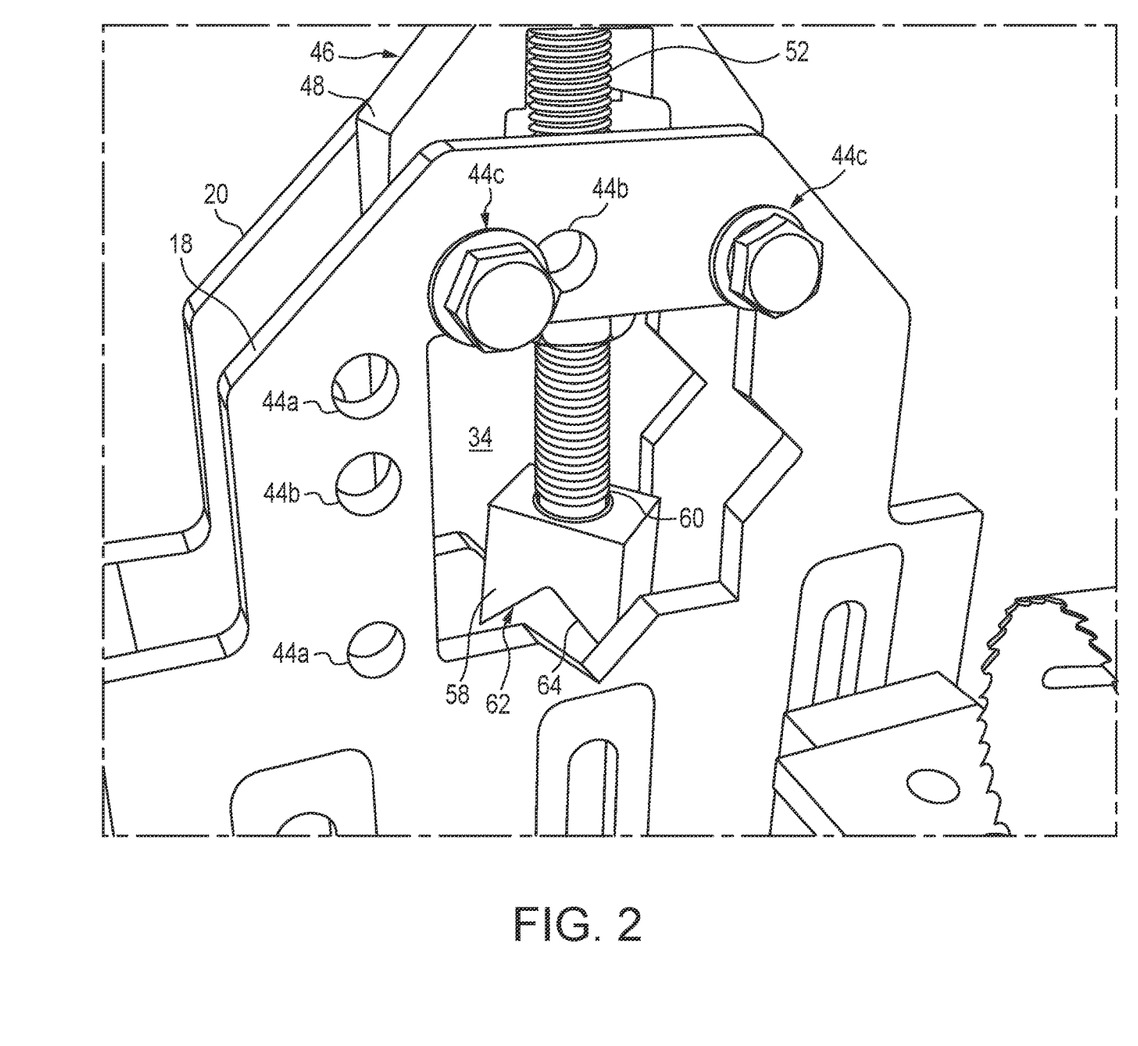
FIG. 2 is a partial perspective view of the tube notching apparatus of the example embodiment illustrated in FIG. 1.
Figure 3:
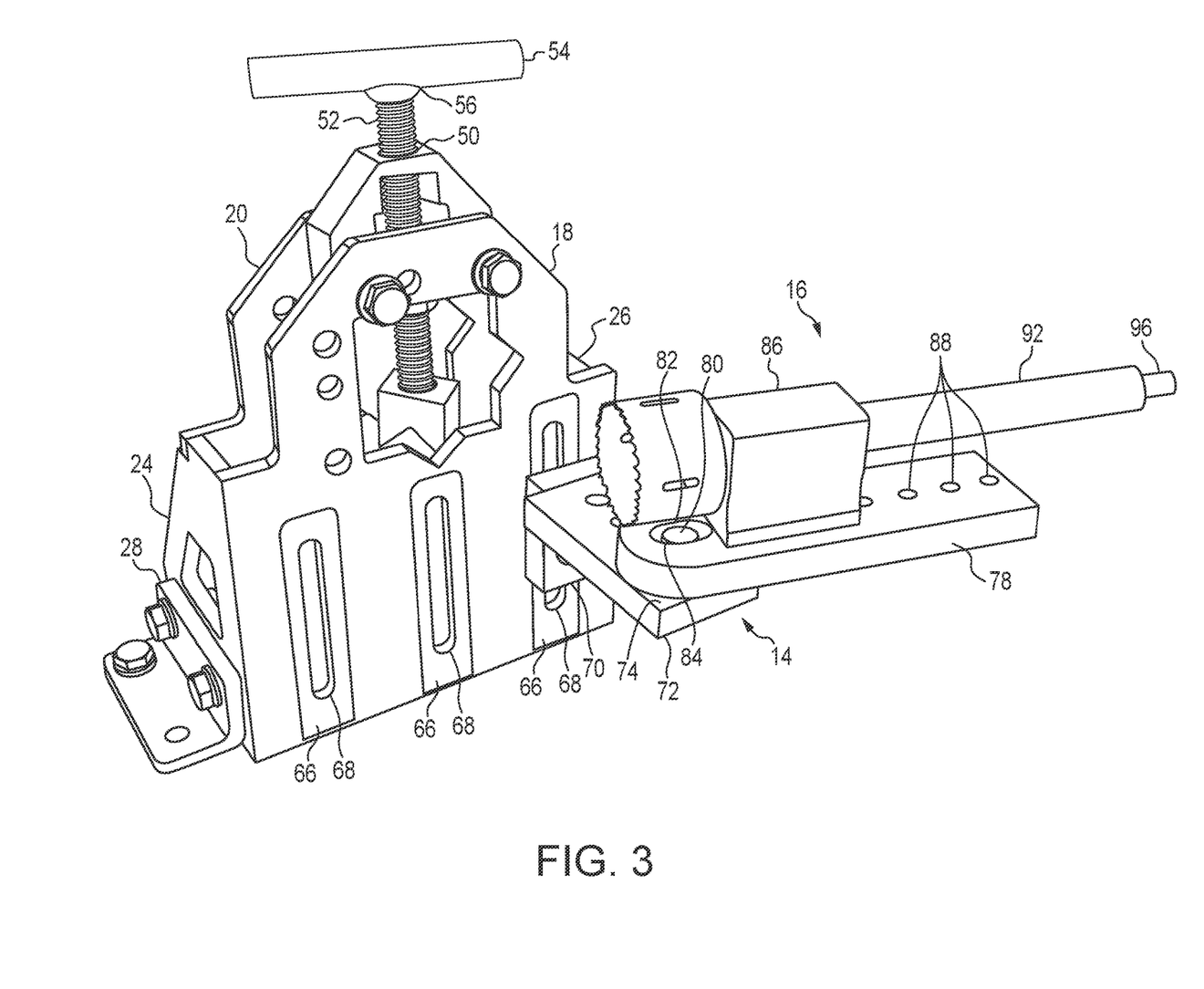
FIG. 3 is a perspective view of the tube notching apparatus of the example embodiment illustrated in FIG. 1.
Figure 4:
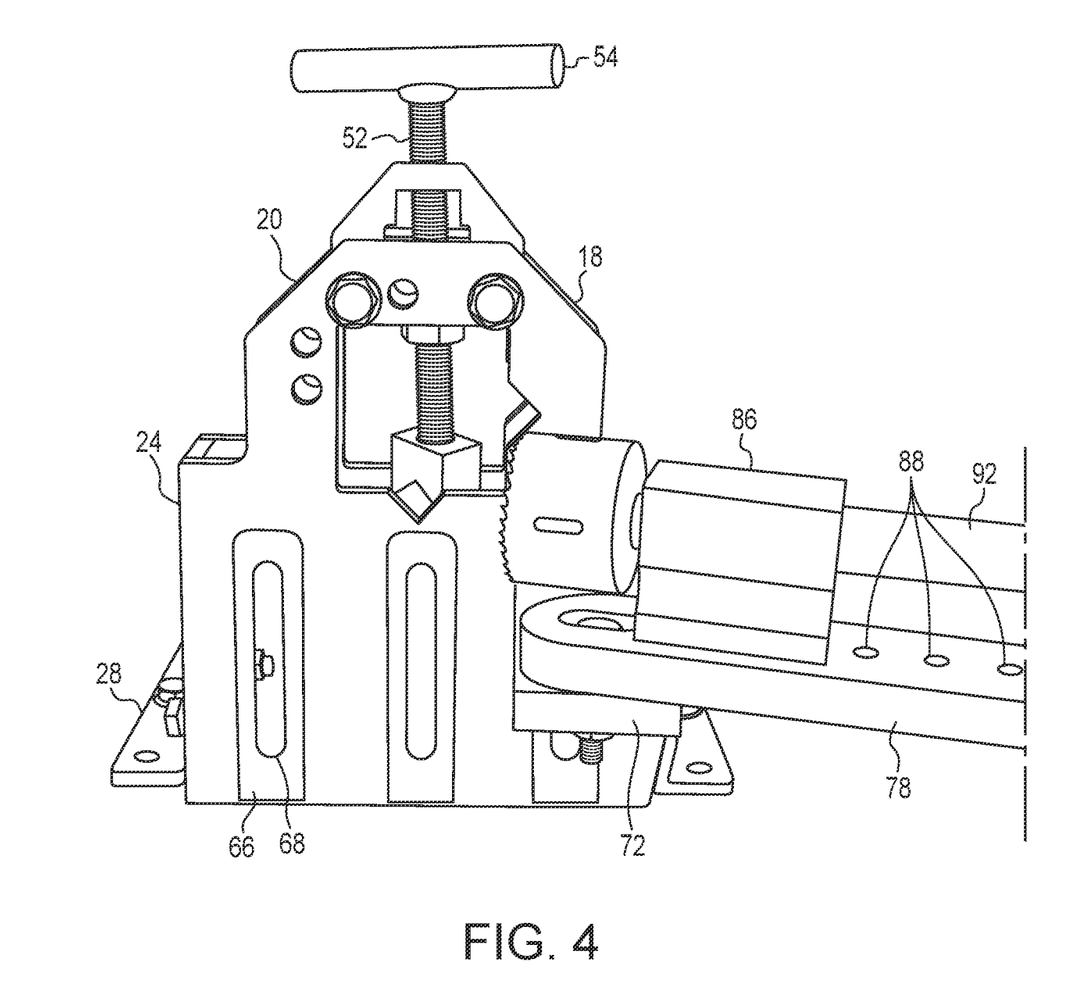
FIG. 4 is a partial perspective view of the tube notching apparatus of the example embodiment illustrated in FIG. 1.
Figure 5:
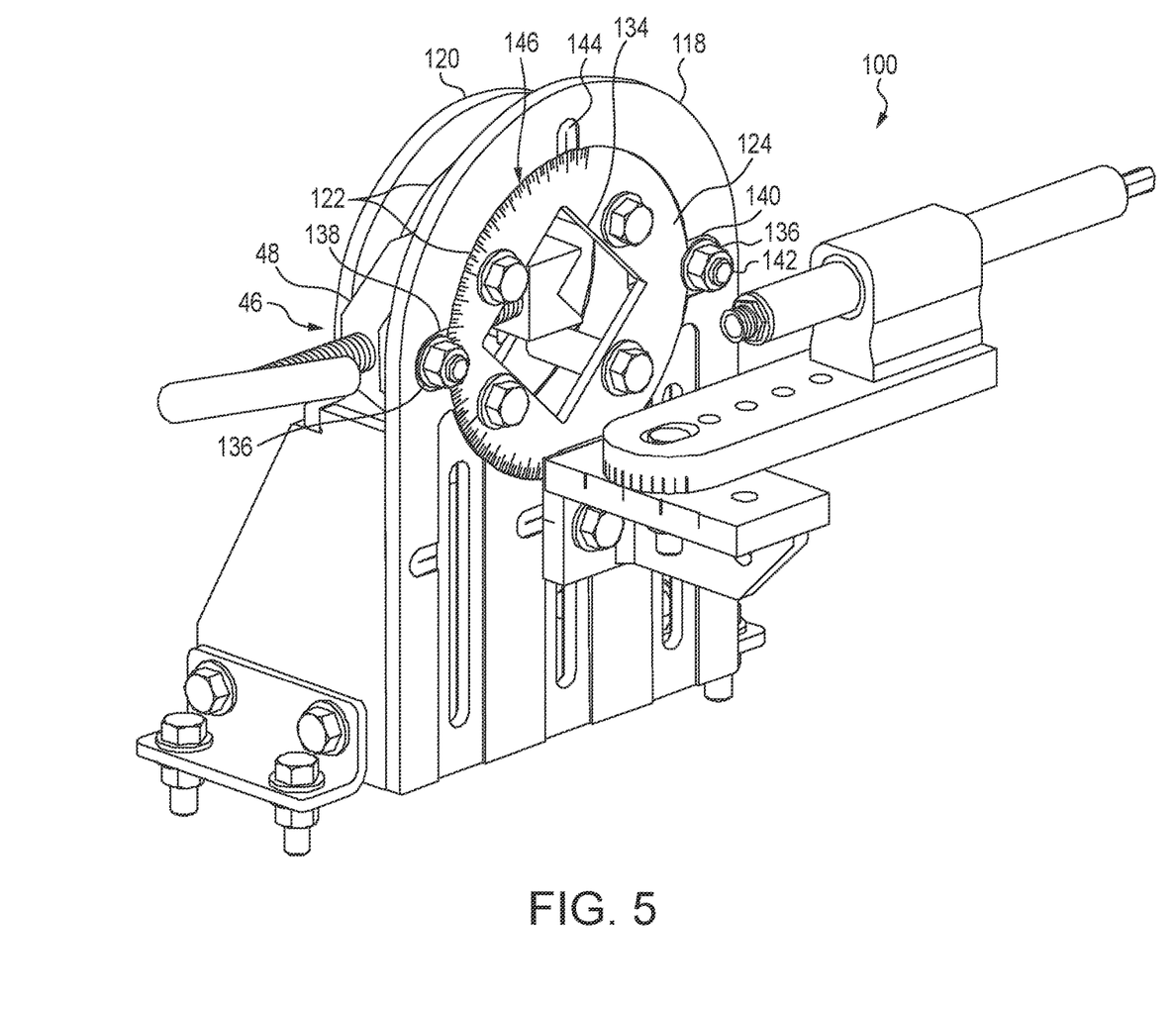
FIG. 5 illustrates a perspective view of a tube notching apparatus with adjustable positioning features according to another example embodiment of the present general inventive concept.
Figure 6:
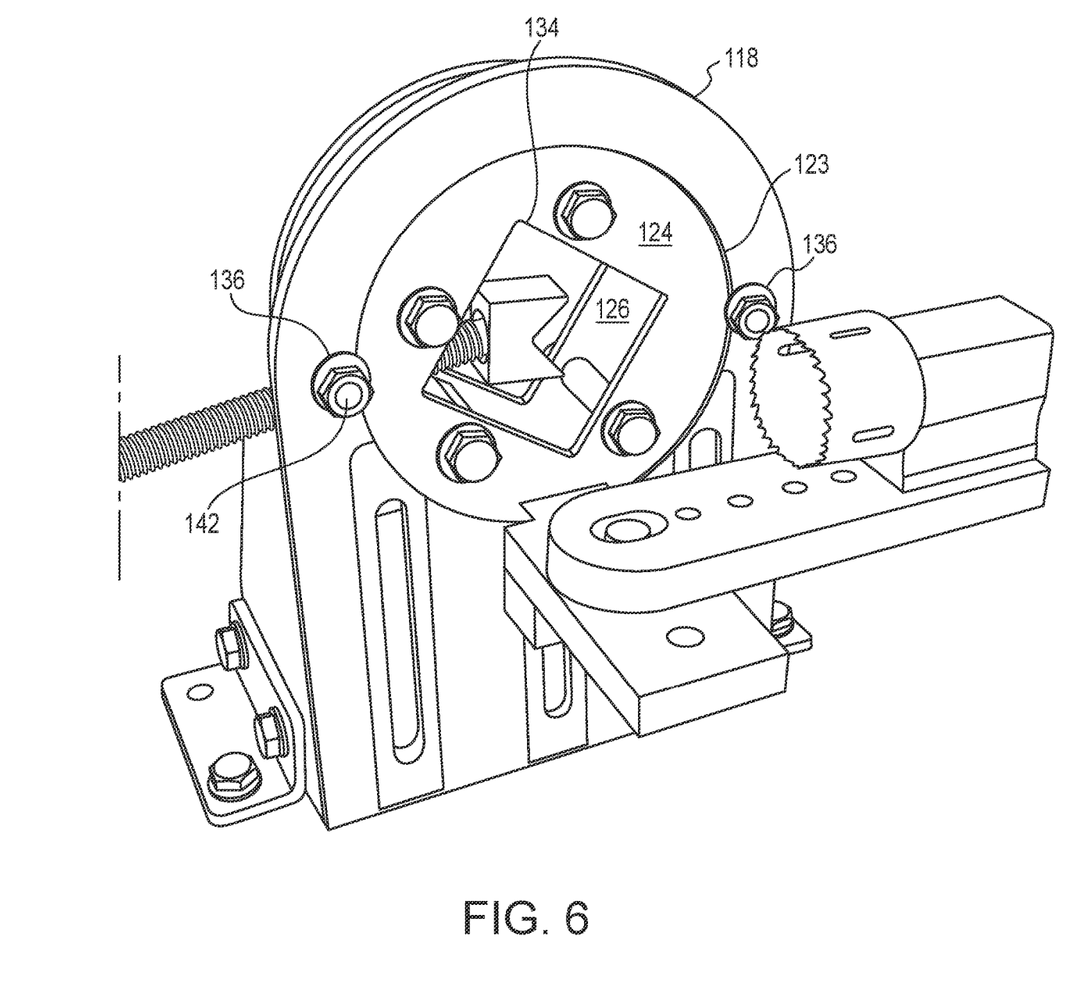
FIG. 6 is a partial perspective view of the tube notching apparatus of the example embodiment illustrated in FIG. 5.
Figure 7:
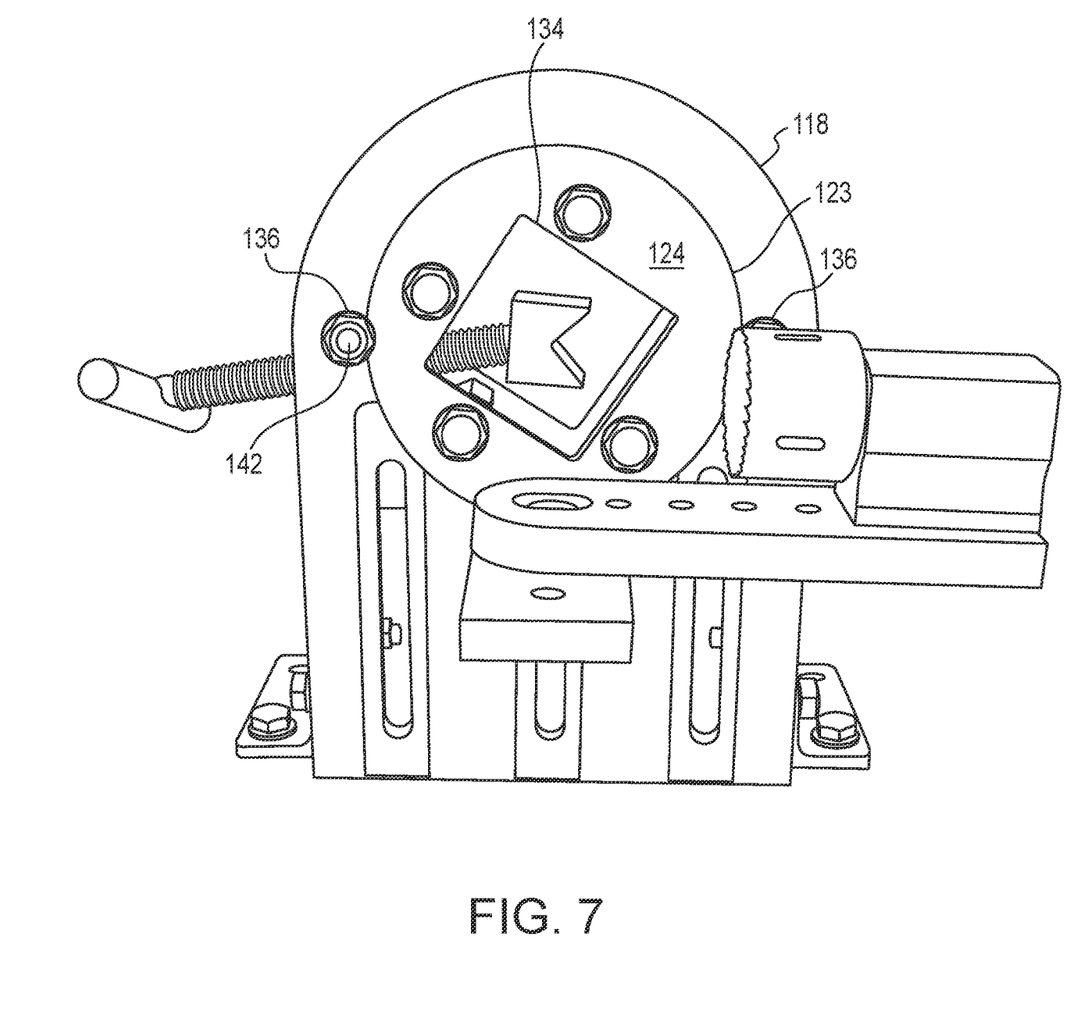
FIG. 7 is a perspective view of the tube notching apparatus of the example embodiment illustrated in FIG. 5.
Figure 8:
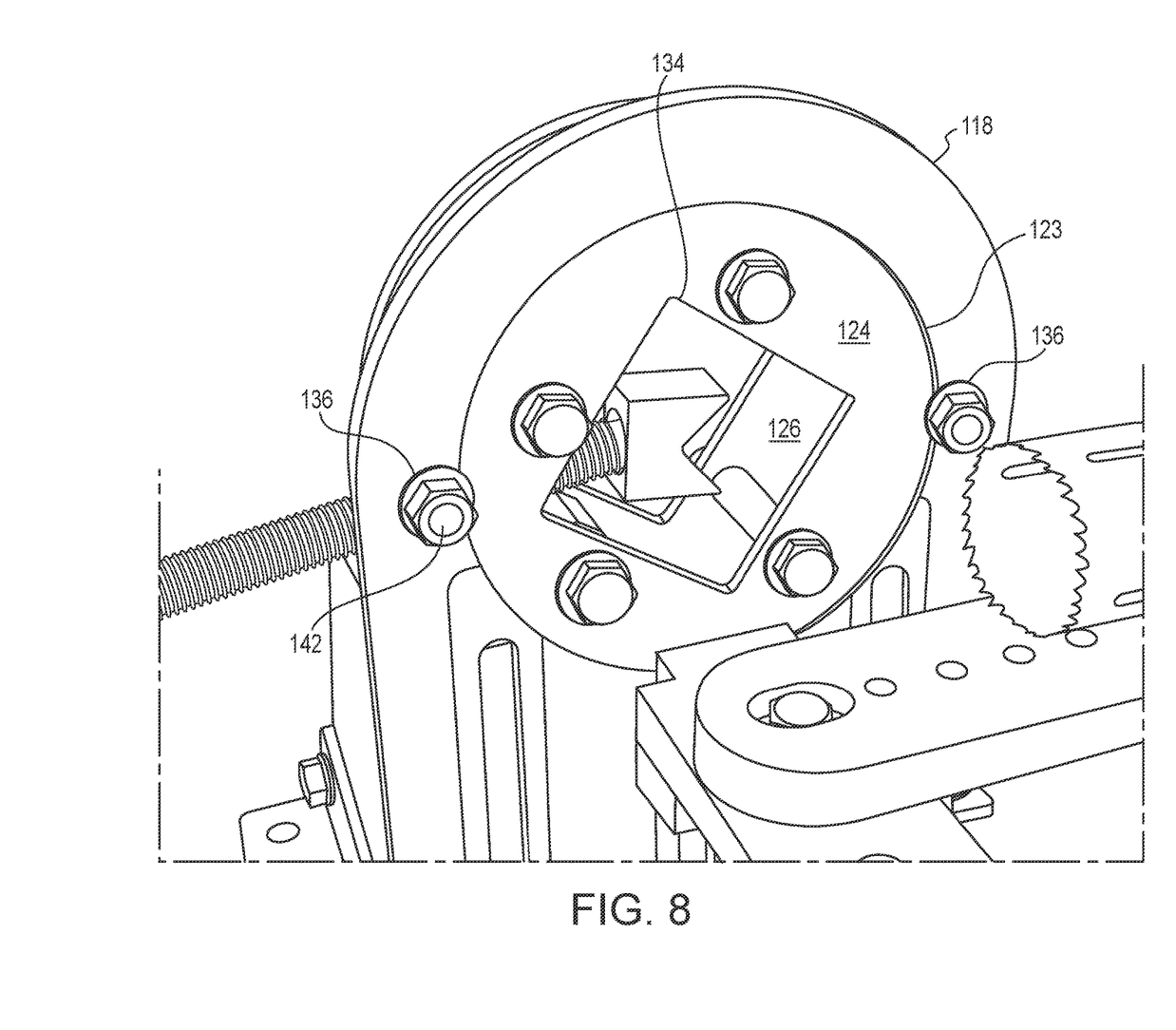
FIG. 8 is a partial perspective view of the tube notching apparatus of the example embodiment illustrated in FIG. 5.

FIGS. 1-8 illustrate various embodiments of a tube notching apparatus according to example embodiments of the present general inventive concept. In the example embodiment illustrated in FIGS. 1-4, the tube notching apparatus 10 includes generally a tube support assembly 12 comprising a pair of vertical frame members 18, 20, each of which preferably, but not essentially, defines a substantially planar shape. The frame members 18, 20 are held in a substantially overlapping, parallel-planar, spaced apart relationship to one another via a plurality of mounting members 22 which, in the illustrated embodiment, include a pair of side support members 24, 26 having angle brackets 28, 30 mounted thereto and a plurality of suitably sized bolts 32 mounted through corresponding holes in the angle brackets, such that the bolts 32, and also corresponding nuts, flat washers, lock washers, etc., provided therewith, may be used to mount the tube support assembly 12 to a suitable support surface, such as for example a table, work bench, or the like.

In the illustrated embodiment, the vertical frame members 18, 20 each define a through opening of similar, and preferably identical, size and shape, and the pair of through openings are disposed along corresponding frame members 18, 20 such that the two through openings are positioned in overlapping, parallel-planar, and spaced apart registration with one another. Thus, the pair of through openings cooperate to define a single aperture 34 in the pair of spaced-apart vertical frame members 18, 20, through which a tubular workpiece may be received, as for example by threading the tubular workpiece through the aperture 34 along a longitudinal axis of the tubular workpiece. In the illustrated embodiment, each through opening of the vertical frame members 18, 20, and thus, of the aperture 34, defines generally a substantially rectangular shape, and preferably, though not essentially, a square shape. However, in the illustrated embodiment, each of a pair of adjacent sides 36, 38 of the aperture 34 further defines a substantially right-angle-shaped notch 40, 42 extending outwardly from a corresponding one of the adjacent sides 36, 38. The notches 40, 42 of the aperture 34 are disposed along respective adjacent sides 36, 38 of the aperture 34, and in relation to one another, such that the notches 40, 42 each define an inner side which extends in parallel, coplanar relationship with an adjacent inner side of the other notch. Thus, the notches 40, 42 cooperate to define a portion of another rectangular, and preferably but not essentially square, shape.

In the illustrated embodiment, the substantially square shape defined by the aperture 34 and the partial square shape defined by the notches 40, 42 are oriented at 45-degree angles to one another along a circumferential dimension of the aperture 34. Thus, a rectangular (or square) tube may be received within the aperture in a first "roll" orientation, with a flat surface of the tube extending parallel to one or more of the sides 36, 38 of the aperture 34, or alternatively, in a second "roll" orientation, with the same flat surface of the tube extending along one or more sides of the notches 40, 42, at a 45-degree angle to the sides 36, 38 of the aperture 34.

The pair of vertical frame members 18, 20 each define corresponding pairs of tube retention device mounting holes 44a-44c, each pair of holes 44a-44c being in overlying registration with one another, disposed about respective sides of the aperture 34. Each pair of tube retention device mounting holes 44a-44c is sized to receive a corresponding fastener, such as the illustrated sets of nut, bolt, and washer fasteners, therethrough in order to mount a tube retention device 46 between the vertical frame members 18, 20, proximate the aperture 34. In the illustrated embodiment, the tube retention device 46 includes a carriage 48 defining an internally threaded through hole 50 therethrough, and an externally threaded clamp rod 52 sized and shaped to threadably mate with and engage the through hole 50. A handle 54 is fixed to a distal end 56 of the clamp rod 52 to allow for convenient manual rotation of the clamp rod 52 within the through hole 50, and a clamp head 58 is rotatably secured to a proximal end 60 of the clamp rod 52, such that the clamp head 58 is substantially free to rotate about a central axis of the clamp rod 52. A plurality of through holes (not shown) are defined along the carriage 48, with each through hole being sized to correspond and register with one of the pairs of tube retention device mounting holes 44, and to receive a corresponding fastener of the mounting hole 44 therethrough. The through holes of the carriage 48 are oriented such that the carriage 48 is mountable in at least two positions between the vertical frame members 18, 20 with each position allowing the clamp rod 52 to extend generally perpendicular to one of the two sides 36, 38 of the aperture 34 defining the notches 40, 42. Thus, threaded rotation of the clamp rod 52 in relation to the carriage 48 secured between the vertical frame members 18, 20 results in translation of the clamp head 58 toward and away from one of the notches 40, 42. In this manner, a tube may be positioned within the aperture 34 and clamped within the aperture 34 by translating the clamp head 58 toward the corresponding first or second side 36, 38 of the aperture 34.

In the illustrated embodiment, a distal surface 62 of the clamp head 58 defines a substantially planar outer surface extending generally normal to the longitudinal axis of the clamp rod 52. The distal surface 62 further defines a right-angle shaped V-notch 64 extending along a central dimension thereof. The V-notch 64 is sized, shaped, and positioned along the clamp head 58 such that the clamp head 58 may be extended toward a corresponding one of the notches 40, 42 to a position in which the V-notch 64 cooperates with the notches 40, 42 to further define a portion of the square shape partially defined by the notches 40, 42. Thus, a rectangular or square shaped tube inserted into the aperture 34 and positioned along one or more of the notches 40, 42 may be secured within the aperture 34 along the V-notch 64 and corresponding one of the notches 40, 42.

With further reference to FIGS. 1-4, in the present embodiment, a first of the vertical frame members 18 defines a plurality of vertically-extending through channels 66, each of the through channels 66 extending generally parallel to one another and defining a central slot 68 extending along a longitudinal axis thereof. Each of the through channels is configured to receive a selectively slidable and selectively securable fastener 70 therein for slidably mounting a substantially horizontal platform 72 thereto. In the illustrated embodiment, a platform 72 is provided having a substantially horizontally-extending top surface 74 and a vertical mounting block 76 extending substantially perpendicular thereto along an edge thereof. The mounting block 76 defines a through opening and a plurality of projections extending outwardly from the edge of the top surface 74, the projections being sized and shaped to correspond and mate with a cross section of the channels 66. The through opening of the mounting block 76 is sized and oriented along the mounting block 76 such that, when the mounting block 76 is positioned in mating engagement along one of the channels 66, the through opening aligns with the central slot 68 of the channel 66. Thus, a nut and bolt fastener may be received through the through opening of the mounting block 76 and the central slot 68 of the channel 66 and tightened in order to fix the mounting block 76, and thus the platform 72, in position in relation to the vertical frame member 18. Likewise, the nut and bolt fastener may be loosened to allow the mounting block 76 to slide in relation to the vertical frame member 18 along the corresponding channel 66. Thus, the positioning of the mounting block 76 and corresponding platform 72 may be selectively adjusted along the vertically extending channel 66 and/or repositioned to a different channel 66, where upon the fastener may be tightened to secure the platform 72 in the desired position.

In the embodiment of FIGS. 1-4, a pivot member 78 is secured to the platform 72 about a pivot point 80 defined along the top surface 74. In the illustrated embodiment, the pivot point 80 is defined by a pair of registered through openings 82 extending vertically through the platform 72 and the pivot member 78, and a nut and bolt fastener 84 extending therethrough. The nut and bolt fastener 84 may be loosened to allow the pivot member 78 to swivel about a central axis of the pair of registered through openings 82 along the horizontally-extending top surface 74 of the platform 72, and then tightened to secure the pivot member 78 in relation to the platform 72. A bearing block 86 is mountable to the pivot member 78, as by a plurality of through openings 88 defined along a length of the pivot member 78 and one or more fasteners configured to be received therein and to engage the pivot member 78 and bearing block 86 in fixed relationship to one another, or by other means readily known to one of skill in the art.

The bearing block 86 defines a cylindrical bearing 90 having a rotatable tool shaft 92 received therein. A proximal end 94 of the tool shaft 92 is configured to carry and support a rotatable cutting tool head, such as for example a "hole saw" or other such device, and an opposite distal 96 end of the tool shaft 92 is configured to be operatively coupled to a rotatable tool, such as for example a drill, to rotatably drive the tool shaft 92 and tool head. The tool shaft 92 is rotatable within the bearing 90 and is slidable along a longitudinal dimension thereof. Thus, with the tool shaft 92 operatively coupled to a rotatable tool and the rotatable tool driving the tool shaft 92 and the tool head, the shaft 92 may be slid along the bearing block 86 to define a cutting path of the tool head.

From the foregoing description, it will be recognized that a central co-axis of the bearing 90 and tool shaft 92 may define a cutting path of a rotatable cutting tool head secured to the tool shaft 92, and that the various adjustable connections between the channels 66 and the platform 72 and between the platform 72 and the pivot member 78 allow the shaft 92 to be selectively repositionable in relation to the aperture 34, both in a vertical "offset" dimension in linear relation to a longitudinal centerline of a tube received within the aperture 34, and in a rotating "yaw" dimension defined by a plane parallel to the tool shaft 92 and the longitudinal centerline of a tube received within the aperture 34. Additionally, the above-described configuration of the aperture 34 having the aforementioned notches 40, 42, and the tube retention device 46 having the clamp head 58 defining the V-Notch 64, allow for the selective adjustment of the positioning of a tube received within the aperture 43 in a rotating "roll" dimension about a longitudinal centerline of the tube. Thus, it will be recognized that the embodiment of the tube notching apparatus 10 of FIGS. 1-4 allows for adjustment of the orientation of a tubing received within the aperture 34 in relation to the cutting path of the shaft 92 and cutting head about the circumference of the cross-section of the tubing, as well as in relation to "offset" and "yaw" dimensions of the tubing. It will be recognized that such device may be used to create straight, angled, and offset notches in the tubing about a wide variety of orientations.

FIGS. 5-8 illustrate another embodiment of a tube notching apparatus according to an example embodiment of the present general inventive concept. In the example embodiment illustrated in FIGS. 5-8, a tube notching apparatus 100 is provided that includes first and second vertical frame members 118, 120 defining corresponding circular through openings 122 therein. The circular through openings 122 of the vertical frame members 118, 120 are arranged in coaxial relationship with one another, and in the illustrated embodiment, at least one, and preferably both, of the circular through openings of the vertical frame members 118, 120 defines an inwardly projecting lip 123 extending slightly inward about a circumference of the through opening. A pair of circular plates 124, 126 are provided, with each plate 124, 126 being sized to fit nicely within a corresponding one of the circular through openings 122 and to slidably rotate within the through opening and along a corresponding lip along a planar dimension of the vertical frame members 118, 120. Similarly to the aperture 34 described above with regard to the embodiment of FIGS. 1-4, in the embodiment of FIGS. 5-8, the circular plates 124, 126 each define a through opening of similar, and preferably identical, size and shape, and the pair of through openings are disposed coaxially with the circular plates 124, 126 such that the two through openings are positioned in overlapping, parallel-planar, and spaced apart registration with one another. Thus, the pair of through openings cooperate to define an aperture 134 in the pair of circular plates 124, 126 disposed within the spaced-apart vertical frame members 118, 120, through which a tubular workpiece may be received, as for example by threading the tubular workpiece through the aperture 34 along a longitudinal axis of the tubular workpiece.

In the illustrated embodiment, suitable pairs of registering through holes are provided along the plates 124, 126 to secure a carriage 48 portion of a tube retention device 46 of the type discussed above between the plates 124, 126, proximate the aperture 134. Thus, in the illustrated embodiment, the aperture 134 is defined by, and the tube retention device 46 is secured between, the plates 124, 126, rather than directly between the spaced-apart vertical frame members 18, 20 as discussed above with regard to the embodiment of FIGS. 1-4. It will therefore be recognized that, in the embodiment of FIGS. 5-8, slidable rotation of the plates 124, 126 in relation to the vertical frame members 118, 120 results in infinitely variable rotational repositioning of a tube secured within the aperture 134 about the "roll" dimension of the tube, along a cross-sectional circumference of the tube and about a longitudinal dimension of the tube.

In the illustrated embodiment, a pair of locking fasteners 136 are provided along the circumference of the plates 124, 126 and the through openings 122 to allow the plates 124, 126 to be selectively secured against rotational movement in relation to the vertical frame members 118, 120. More specifically, in the illustrated embodiment, a pair of relatively shallow recesses 138, 140 are defined in the vertical frame members 118, 120 along opposite sides of the through openings 122. For each recess 138, 140, an externally threaded post 142 is provided extending horizontally outwardly from a central portion of the recess 138, 140, parallel to the central axis of the through openings 122. An internally threaded fastener, such as for example a nut, may be threadably received in mating engagement with each post 142 and tightened against the corresponding recess 138, 140. Each threaded fastener is sized to slightly overhang the interface between the through opening 122 and the plate 124, 126. Thus, each threaded fastener may be threadably tightened along a corresponding post 142 until the threaded fastener meets and engages an edge of a corresponding plate 124, 126, thereby establishing a frictional engagement with the plate to secure the plate against rotation in relation to the vertical frame members 118, 120. Likewise, by loosening the threaded fasteners from the posts 142, slidable rotation of the plates 124, 126 in relation to the vertical frame members 118, 120 may be allowed, thereby allowing for infinitely variable rotational repositioning of a tube secured within the aperture 134 about the "roll" dimension of the tube.

In the illustrated embodiment, the aperture 134 defines a rectangular shape, and preferably though not essentially, a square shape. Furthermore, in the illustrated embodiment, a reference mark 144 is provided at a location along an external surface of one of the vertical frame members 118 adjacent the through opening 122 of the vertical frame member 118. A series of indicia are provided along a corresponding adjacent surface of one of the plates 124, about at least a portion of the circumferential perimeter of the plate 124, with the indicia denoting an angle of rotation of the plates 124, 126 in relation to the vertical frame members 118, 120, and in relation to the reference mark 144. Thus, a user is able to position a tube within the aperture 134 at a first "roll" orientation, lock the tube within the aperture 134 using the above-discussed tube retention device 46, and then selectively rotate the plates 124, 126 in relation to the vertical frame members 118, 120 to achieve any one of an infinitely variable number of second "roll" orientations of the tube as desired. Thereafter, a user may tighten the threaded fasteners onto the posts 142, whereupon the plates 124, 126, corresponding aperture 134, and tube secured therein, are locked in the desired second "roll" orientation.

From the foregoing description, it will be recognized that the above-discussed infinitely rotatably adjustable plates 124, 126, together with the above-described various adjustable connections between the channels 66 and the platform 72 and between the platform 72 and the pivot member 78, allow for a shaft 92 of the tube notching apparatus 100 to be selectively repositionable in relation to the aperture 134, in an infinitely variable number of orientations about a "roll"

dimension of a tubular workpiece disposed within the aperture 134. Additionally, the shaft 92 of the tube notching apparatus 100 is adjustable both in a vertical "offset" dimension in linear relation to a longitudinal centerline of a tube received within the aperture 134, and in a rotating "yaw" dimension defined by a plane parallel to the tool shaft 92 and the longitudinal centerline of a tube received within the aperture 134.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A tube notching apparatus capable of operable attachment to a powered rotational drive device, the apparatus comprising:
    a tube support assembly comprising a first frame member and a second frame member cooperating to define an aperture for receiving a tube;
    a clamp for securing the tube against movement in relation to the aperture, the clamp comprising:
        a clamp head mounted for linear translation toward and away from the aperture;
        a rod secured to the clamp head and mounted for movement along a central axis of the rod in relation to the first frame member, and;
        a carriage defining an internally threaded through hole, the rod defining external threads sized and shaped to threadably mate with and engage the through hole, the carriage being removably mountable between the first and second frame members at a plurality of locations about the aperture;
        whereby rotation of the rod about the central axis of the rod results in translation of the rod and clamp head toward and away from the aperture; and
        wherein the carriage is removably mountable to the first frame member at a plurality of locations about the aperture;
    a shaft assembly for receiving a cutting tool; and
    a carriage assembly rotatably mounted to the shaft assembly and having at least one fastener for securing the shaft assembly in relation to the aperture,
    wherein the shaft assembly is selectively repositionable in relation to the aperture in an offset dimension defined by linear displacement from a central axis of the aperture, in a yaw dimension defined by a plane extending along a central axis of the aperture, and in a roll dimension defined by a cross-sectional circumference of a tube received within the aperture.

2. The tube notching apparatus of claim 1, the clamp head defining at least a portion of a rectangular shape for orienting a tube in a first orientation about an axial dimension of the aperture.

* * * * *